Aug. 20, 1929.  W. RIENKS  1,724,966
ILLUMINATING MEANS FOR SCALE INDICATORS
Filed Nov. 11, 1927
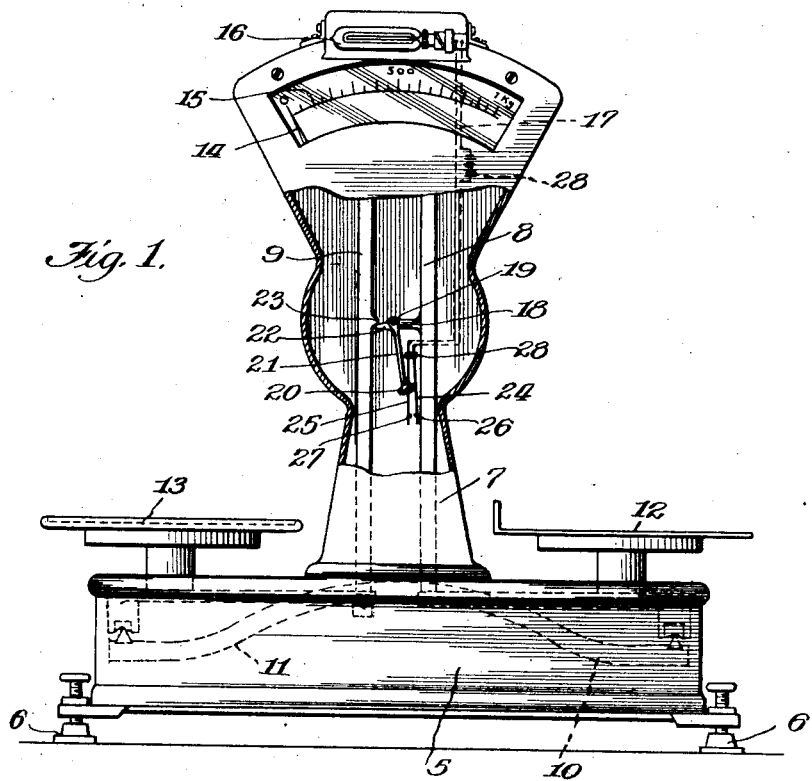
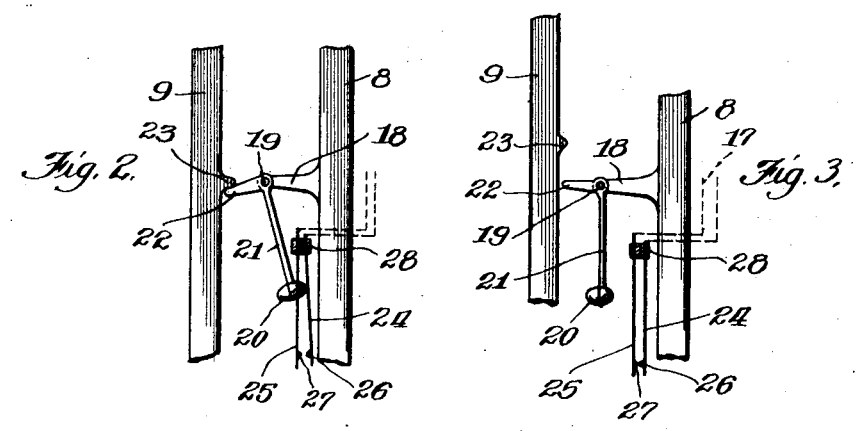

Patented Aug. 20, 1929.

1,724,966

UNITED STATES PATENT OFFICE.

WILLIAM RIENKS, OF ROTTERDAM, NETHERLANDS, ASSIGNOR TO NAAMLOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS.

ILLUMINATING MEANS FOR SCALE INDICATORS.

Application filed November 11, 1927, Serial No. 232,535, and in Germany February 8, 1927.

This invention relates in general to weighing apparatus and has particular reference to means for illuminating the indicators of such apparatus.

Since the invention has been designed primarily for use in combination with counter scales, this particular adaptation has been selected for illustrating the same in the accompanying drawings, in which:—

Fig. 1 is a view in front elevation and partly in section of a counter scale illustrating the application of my invention;

Fig. 2 is a detail view in side elevation showing the open position of the circuit closer and its association with the check links of the scale; and Fig. 3 is a similar view but showing the circuit closer closed.

Referring now to the drawings in detail, the scale per se which I have selected for illustrating the invention is of more or less conventional construction and comprises a base frame 5 which may be supported upon a counter by the adjustable feet 6. The indicator frame 7 houses the check links 8 and 9 which are connected with the weighing platforms 12 and 13 respectively.

The purpose of the invention is to automatically illuminate the indicator 15 when a load is deposited upon the platform 12 so as to enable the indicator to be accurately read without difficulty or inconvenience. To accomplish this, I prefer to arrange a light bulb 16 adjacent the indicator, within a reflector or shield as an example, with the circuit 17 therefor automatically opened and closed by a circuit closer under the control of the operating mechanism of the scale, preferably that part of the mechanism identified as the check links 8 and 9. Such a circuit closer may be provided in many different ways but I have shown only one form that it may take.

This particular form shown comprises a bracket arm 18 secured to one of the links, namely, the link 8, and projecting laterally thereof toward the link 9 but terminating substantially midway between the two. Pivotally mounted as at 19 to the end of the arm 18 is a pendulum 20. The pendulum arm or rod 21 includes a bell crank so as to provide a fulcrumed lever or finger 22 in advance of the pivot 19. Positioned on the inside of the link 9 is a stop pin, boss, or the like 23 which is arranged to contact with the lever or finger 22 when the links are at rest and impart a downward thrust thereto so as to hold the pendulum 20 at an active tilted angle as in Fig. 2. When in such position, the pendulum will bear against the spring contact arm 24 of the circuit closer and hold it against the spring tension thereof out of contact with its companion arm 25 so as to break the circuit at the contact points 26 and 27. The current from a suitable source 28 will thus be interrupted so that the light 16 will be off when the scale is not being used. Just as soon as a load is deposited on the platform 12, the check links are moved in opposite directions, the link 9 going up and the link 8 going down. This movement of the links will release the pendulum 20 whereupon it will move into a perpendicular position releasing the spring arm 24 and permitting the spring tension of the same to move the contact 26 thereof into circuit closing contact with the contact 27 on the companion arm 25 to complete the circuit of the light 16. The spring arms 24 and 25 may be suitably mounted in a support 28 and wired to circuit 17 at this mounting.

The pendulum should be also constructed to straddle or otherwise clear the arm 25 when moving into and out of contact with the arm 24.

Obviously those skilled in the art may make various changes in the details and arrangement of parts without departing from the spirit and scope of the invention as defined by the claims hereto appended, and I wish therefore not to be restricted to the precise construction herein disclosed.

I claim:—

1. In a scale embodying in its construction two oppositely bodily movable members in the weighing mechanism thereof, the combination of an electric light for illuminating an indicator on the scale, and means actuated by the movement of said members for opening and closing the circuit to said light, said means comprising a pendulum supported by one of said members and movable by the other member into a position to open the circuit to said light.

2. In combination with a scale having a dial and two oppositely bodily movable members in the weighing mechanism thereof, of a light circuit for said dial, a switch in said circuit, the contacts of which are normally held together, pendulum means pivoted to one of said members, the other of said members being formed to engage said pendulum means causing said pendulum means to force said switch contacts apart when said members are in a definite position relative to each other, said pendulum means being released to fall away from its switch holding position when said members are in their positions relative to each other.

3. In combination with a scale having a dial and two oppositely bodily movable members in the weighing mechanism thereof, a light circuit for said dial, a switch in said circuit, the contacts of which are normally held together, a bell crank pivoted to one of said members, said bell crank having a pendulum on one arm thereof, the other of said members having a projection thereon in engaging the other arm of said bell crank, holding said pendulum in position to separate said switch contacts when said members are in a definite position relative to each other, said pendulum falling away from its switch holding position when released through the movement of said member having the projection thereon.

In testimony whereof I have signed my name to this specification on this 25th day of October A. D. 1927.

WILLIAM RIENKS.